United States Patent
Merz et al.

(10) Patent No.: US 9,238,352 B2
(45) Date of Patent: Jan. 19, 2016

(54) ROLL OF FLEXIBLE GLASS AND METHOD FOR ROLLING

(75) Inventors: Gary Edward Merz, Rochester, NY (US); John Earl Tosch, Wellsburg, NY (US)

(73) Assignee: Corning Incorporated, Corning, NY (US)

( * ) Notice: Subject to any disclaimer, the term of this patent is extended or adjusted under 35 U.S.C. 154(b) by 696 days.

(21) Appl. No.: 13/695,689

(22) PCT Filed: May 26, 2011

(86) PCT No.: PCT/US2011/038036
§ 371 (c)(1),
(2), (4) Date: Nov. 1, 2012

(87) PCT Pub. No.: WO2011/150149
PCT Pub. Date: Dec. 1, 2011

(65) Prior Publication Data
US 2013/0045366 A1    Feb. 21, 2013

Related U.S. Application Data

(60) Provisional application No. 61/349,438, filed on May 28, 2010.

(51) Int. Cl.
*B32B 17/06* (2006.01)
*B65H 18/28* (2006.01)

(52) U.S. Cl.
CPC .............. *B32B 17/064* (2013.01); *B65H 18/28* (2013.01); *B65H 2801/61* (2013.01); *Y10T 428/24488* (2015.01); *Y10T 428/24752* (2015.01); *Y10T 428/249987* (2015.04); *Y10T 428/266* (2015.01)

(58) Field of Classification Search
CPC  B32B 17/06; B32B 17/064; B32B 17/10018; B65H 18/08; B65H 23/00
USPC ................... 428/157, 426, 906; 242/410, 530
See application file for complete search history.

(56) References Cited

U.S. PATENT DOCUMENTS

| | | | |
|---|---|---|---|
| 2,457,785 A | 12/1948 | Slater et al. | 49/17 |
| 3,015,385 A | 1/1962 | Chesnut et al. | 206/59 |

(Continued)

FOREIGN PATENT DOCUMENTS

| | | |
|---|---|---|
| EP | 0808722 | 11/1997 |
| EP | 2236281 | 10/2010 |

(Continued)

OTHER PUBLICATIONS

Machine Translation of JP200791413.

(Continued)

*Primary Examiner* — Catherine A Simone
(74) *Attorney, Agent, or Firm* — Jeffrey A. Schmidt

(57) ABSTRACT

A roll (10) of glass ribbon (20), having a thickness of 0.3 mm or less, wherein a thickness compliant material interlayer (40) is wound together with the glass ribbon. The characteristics of the interlayer are chosen to form the roll with minimal lateral offset (9). For example, the static coefficient of friction between the interlayer and the glass ribbon may be greater than or equal to 3.0 (as measured with a vertical force of 0.5 N). Other characteristics may include the width, thickness, and compliance, of the interlayer. There is also disclosed a method of rolling a glass ribbon wherein the roll winding parameters, for example web tension and pressure between the layers of the roll, are chosen to minimize the lateral offset.

20 Claims, 6 Drawing Sheets

(56) References Cited

U.S. PATENT DOCUMENTS

| | | | |
|---|---|---|---|
| 3,089,801 A | 5/1963 | Tierney et al. | 154/47 |
| 3,391,053 A | 7/1968 | Kolb | 161/185 |
| 3,574,030 A | 4/1971 | Callander et al. | 156/244 |
| 3,622,298 A | 11/1971 | Machlan et al. | 65/91 |
| 4,069,359 A | 1/1978 | DeMarse et al. | 428/36 |
| 4,328,276 A | 5/1982 | Swarovski | 428/213 |
| 6,502,423 B1 | 1/2003 | Ostendarp et al. | 65/29.14 |
| 6,815,070 B1 | 11/2004 | Bürkle et al. | 428/425.6 |
| 7,231,786 B2 | 6/2007 | Cimo et al. | 65/91 |
| 2008/0280057 A1 | 11/2008 | Hawtof et al. | 427/450 |
| 2009/0277983 A1 | 11/2009 | Kanzaki et al. | 242/160.4 |
| 2011/0217521 A1 | 9/2011 | Teranishi et al. | 428/189 |
| 2011/0223386 A1 | 9/2011 | Tomamoto et al. | 428/156 |

FOREIGN PATENT DOCUMENTS

| | | |
|---|---|---|
| JP | 2004/199643 | 7/2004 |
| JP | 2005-075366 | 3/2005 |
| JP | 2005-170399 | 6/2005 |
| JP | 2005-239242 | 9/2005 |
| JP | 200791413 | 4/2007 |
| JP | 2007-262409 | 10/2007 |
| WO | 87/06626 | 11/1987 |
| WO | 2010/038757 | 4/2010 |
| WO | 2010/038758 | 4/2010 |
| WO | 2010/038759 | 4/2010 |
| WO | 2010/038760 | 4/2010 |
| WO | 2010/038761 | 4/2010 |

OTHER PUBLICATIONS

JP2013513235 Office Action.

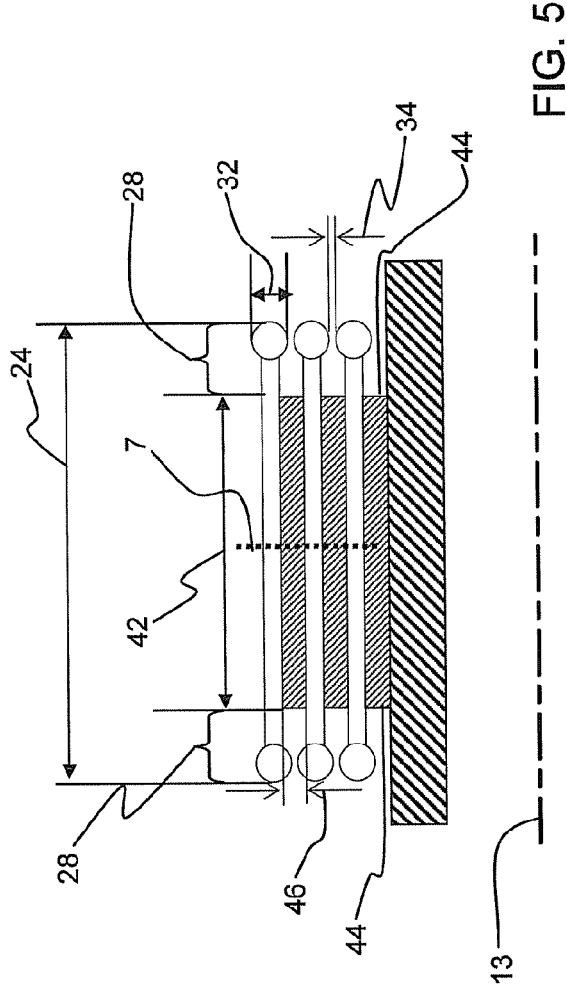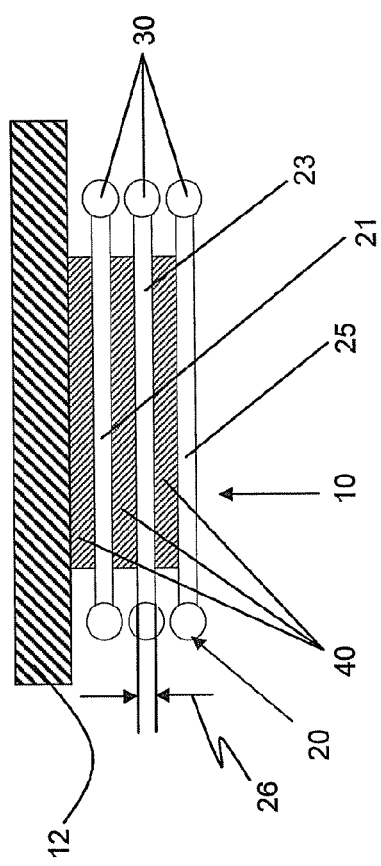
FIG. 5

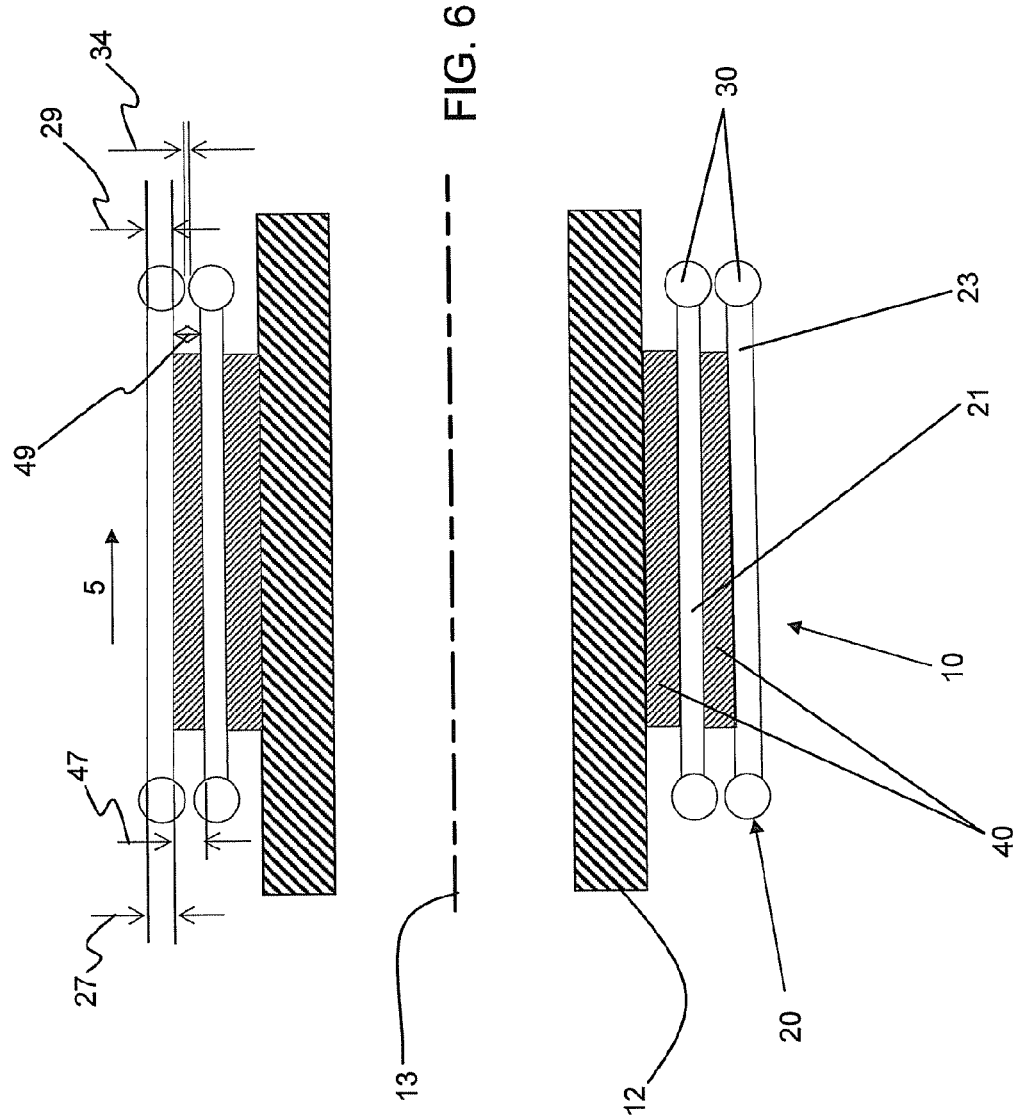

ROLL OF FLEXIBLE GLASS AND METHOD FOR ROLLING

This application claims the priority of U.S. Provisional Application Ser. No. 61/349,438 filed on May 28, 2010.

FIELD OF INVENTION

The invention is directed to a roll of flexible glass and a method for rolling the glass. More particularly, the invention is directed to a roll of flexible glass ribbon wound together with an interlayer, and to a method for rolling them together.

TECHNICAL BACKGROUND

Although formed as a continuous ribbon, glass is typically segmented into sheets as soon as it has cooled and solidified. Recent product trends—in ePaper front plane substrates, protective cover sheets in photovoltaic modules, touch sensors, solid state lighting, and electronics, for example—have resulted in requirements for thinner and thinner glass. As glass thicknesses continues to decrease, however, these sheets become more flexible. This creates a challenge from a handling perspective, particularly for glass of 0.3 mm or thinner. Accordingly, there have been attempts to roll thin glass as a manner of facilitating handling. However, there are several unique features of glass that create challenges for successfully implementing a rolling process. First the edge "beads" of the glass, as formed, are substantially thicker than the constant thickness area in between. Second glass is extremely sensitive to surface defects. These defects create stress points that generate cracks and lead to breakage. Thus it is not advisable to have direct surface to surface contact of glass to itself, as is typical in a spooled roll of material. The challenges from these first two characteristics have been addressed by using various interleaf materials between layers of the glass ribbon when winding. Third, as noticed by the inventors of the present disclosure, and which has gone unaddressed—in terms of their effect on rolling thin glass ribbon, i.e. 0.3 mm or thinner—to this point as far as the present inventors are aware, is that the forming process can introduce differential thickness across the width of the glass ribbon and/or camber (continuous curvature in one direction caused by differential cooling between the two edge beads). When rolling a glass ribbon with differential cross-ribbon thickness and/or camber, lateral forces are generated in the spooled roll that result in angled, rather than straight, side walls on the wound roll. In some cases, the angle of the side wall may lead to the glass ribbon contacting a flange of a spool onto which the glass ribbon is being wound, thereby risking damage to the glass ribbon. Additionally, the angled side wall of the spool leads to difficulties in processing, when unwinding the roll to use the glass ribbon in a continuous manufacturing process. Accordingly, there is a need for rolls of wound glass ribbon having straighter side walls.

SUMMARY

In order to form a roll of wound glass ribbon having straight side walls, the inventors have found that the effects of the differential cross-ribbon thickness and/or camber, among other things, can be counteracted by appropriately choosing an interleaf material and rolling conditions.

Some pertinent characteristics of the interleaf material are its coefficient of friction with the glass ribbon being wound, the width of the interlayer with respect to the glass ribbon, compliance, and thickness. First, choosing an interleaf material with a sufficient coefficient of friction between it and the glass ribbon being wound assists in providing a force to resist that produced by the differential thickness and/or camber. Additionally, a sufficient coefficient of friction assists in maintaining roll integrity during subsequent handling, even in rolls that have very low pressure between the layers in the roll, as discussed below. More specifically, a beneficial static coefficient of friction between the interlayer and the glass ribbon was found to be greater than or equal to about 3.0 (as measured with a vertical force of 0.5N), another was found to be from about 3.0 to about 4.6 (as measured with a vertical force of 0.5 N), and another was found to be from about 3.4 to about 4.2 (as measured with a vertical force of 0.5N). Second, an interlayer having a width less than that of the glass ribbon allows the contact between the interlayer and the glass ribbon to occur in the central area of the glass ribbon wherein there is low thickness variation. Additionally, these relative widths allow the glass ribbon some freedom to pivot about its longitudinal axis, which may result from the effects of camber in the glass ribbon. Third, the interlayer should be thickness compliant, or have some give to it when compressed, in order to absorb any thickness differences that may be present in the central portion of the glass ribbon. A suitable stiffness for the interlayer material was found to be less than or equal to about 28.14 N/mm, or less than or equal to about 27.12 N/mm, or less than or equal to about 26.1 N/mm, wherein the lower bound for all ranges was greater than zero. In order to achieve the above-noted stiffness, the interlayer may be formed from, for example, a polyethylene foam (either open or closed cell), a corrugated paper material, or a sheet of soft polyvinyl material having an embossed or textured surface. Fourth, when winding a glass ribbon having beads on its edges, the interlayer is chosen to have a sufficient thickness, when compressed under the rolling conditions as discussed below, so that the beads do not touch one another. The ability to roll the glass ribbon with its beads on facilitates manufacture of the glass ribbon.

Some pertinent rolling conditions are web tension and pressure between the layers in the roll. More specifically, the inventors found that typical web winding process parameters of 1-2 pounds per linear inch (0.179 to 0.357 kg/cm) of web tension, and 15-50 pounds per square inch (1.054 to 3.515 kg/square cm) of pressure between the layers, when used with a thin glass ribbon produced angled side walls in the roll. Further, contrary to conventional wisdom, the inventors found that increasing the web tension and pressure between the layers actually made the side wall characteristics worse. Surprisingly, the inventors found that using lower web tension and lower pressure between the layers produced straighter side walls in the roll. More particularly, a web tension of greater than 0 pounds per linear inch (0 kg/cm), but 0.25 pounds per linear inch (0.45 kg/cm) or less, produced straight side walls on the roll. Additionally, a pressure between the layers in the roll of 10 pounds per square inch (0.703 kg/square cm) or less, but greater than 0 pounds per square inch (0 kg/square cm), produced straight side walls on the roll. Another pressure between the layers in the roll of 7 pounds per square inch (0.492 kg/square cm) or less, but greater than 0 pounds per square inch (0 kg/square cm), also produced straight side walls on the roll. Further, the above-noted coefficients of friction between the interlayer and glass ribbon facilitated using the above-noted unusually low web tension and pressure between the layers in the roll. Also, if there is not sufficient interlayer friction due to a combination of too low a pressure between the layers and/or too low a coefficient of friction, the successive wraps can slide laterally on each other, undesirably creating a "telescoped" side wall.

Additional features and advantages will be set forth in the detailed description which follows, and in part will be readily apparent to those skilled in the art from the description or recognized by practicing the invention as exemplified in the written description and the appended drawings. It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features of the invention disclosed in this specification and in the drawings can be used in any and all combinations. By way of non-limiting example the various features of the invention may be combined with one another as set forth in the following aspects:

According to a first aspect, there is provided a roll of glass ribbon, comprising:
  a glass ribbon;
  an interlayer wound together with the glass ribbon, wherein the glass ribbon has a thickness of 0.3 mm or less,
  wherein the static coefficient of friction between the interlayer and the glass ribbon is greater than or equal to 3.0 (as measured with a vertical force of 0.5 N).

According to a second aspect, there is provided the roll according to Aspect 1 or aspect 31, wherein the static coefficient of friction is from 3.0 to 4.6 (as measured with a vertical force of 0.5 N).

According to a third aspect, there is provided the roll according to Aspect 1 or aspect 31, wherein the static coefficient of friction is from 3.4 to 4.2 (as measured with a vertical force of 0.5 N).

According to a fourth aspect, there is provided the roll according to any one of Aspects 1-3 or 31-36, wherein the stiffness of the interlayer is less than or equal to 28.14 N/mm.

According to a fifth aspect, there is provided the roll according to any one of Aspects 1-3 or 31-36, wherein the stiffness of the interlayer is less than or equal to 27.12 N/mm.

According to a sixth aspect, there is provided the roll according to any one of Aspects 1-3 or 31, wherein the stiffness of the interlayer is less than or equal to 26.1 N/mm.

According to a seventh aspect, there is provided the roll according to any one of Aspects 1-6, wherein the pressure between successive layers of glass ribbon is less than or equal to 10 pounds per square inch (0.703 kg/square cm).

According to an eighth aspect, there is provided the roll according to any one of Aspects 1-7 or 31-36, wherein the interlayer and glass ribbon are wound so that a lateral offset between an inner-most layer of the glass ribbon and an outer-most layer of glass ribbon is less than or equal to 1.6 mm, even when the roll includes up to 150 or more layers of glass ribbon.

According to a ninth aspect, there is provided the roll according to any one of Aspects 1-8 or 31-36, wherein the interlayer comprises a first portion and a second portion disposed at a distance from one another and having a width, wherein the width is centered within ±10% of the center of the glass ribbon,
  wherein the glass ribbon has an outboard end portion, and further wherein there is no interlayer disposed on the outboard end portion.

According to a tenth aspect, there is provided the roll according to any one of Aspects 1-8 or 31-36, wherein the interlayer has a first width, the glass ribbon has a second width and an outboard end portion,
  wherein the first width is less than the second width, and further wherein there is no interlayer disposed on the outboard end portion.

According to an eleventh aspect, there is provided the roll according to any one of Aspects 1-10 or 31-36, wherein the glass ribbon comprises a bead on one of its edges.

According to a twelfth aspect, there is provided the roll according to Aspect 11, wherein the interlayer has a thickness when compressed at a roll-winding pressure up to 70 kPa (10 psi), the bead has a thickness, and the interlayer thickness is greater than a difference between the bead thickness and the ribbon thickness.

According to a thirteenth aspect, there is provided the roll according to any one of Aspects 1-12, wherein the interlayer comprises polyethylene foam.

According to a fourteenth aspect, there is provided the roll according to any one of Aspects 1-13, further comprising a core around which the glass ribbon and the interlayer are wound.

According to a fifteenth aspect, there is provided a method of winding a glass ribbon, comprising:
  winding an interlayer together with a glass ribbon, wherein the glass ribbon has a thickness of 0.3 mm or less,
  wherein the static coefficient of friction between the interlayer and the glass ribbon is greater than or equal to 3.0 (as measured with a vertical force of 0.5 N).

According to a sixteenth aspect, there is provided the method according to Aspect 15, wherein the static coefficient of friction is from 3.0 to 4.6 (as measured with a vertical force of 0.5 N).

According to a seventeenth aspect, there is provided the method according to Aspect 15, wherein the static coefficient of friction is from 3.4 to 4.2 (as measured with a vertical force of 0.5 N).

According to an eighteenth aspect, there is provided the method according to any one of Aspects 15-17, wherein the stiffness of the interlayer is less than or equal to 28.14 N/mm.

According to a nineteenth aspect, there is provided the method according to any one of Aspects 15-17, wherein the stiffness of the interlayer is less than or equal to 27.12 N/mm.

According to a twentieth aspect, there is provided the method according to any one of Aspects 15-17, wherein the stiffness of the interlayer is less than or equal to 26.1 N/mm.

According to a twenty first aspect, there is provided the method according to any one of Aspects 15-20, wherein the winding is performed so that a resulting pressure between successive layers of glass ribbon is greater than zero pounds per square inch (0 kg/square cm) and is less than or equal to 10 pounds per square inch (0.703 kg/square cm).

According to a twenty second aspect, there is provided the method a according to any one of Aspects 15-21, wherein the winding is performed to that a resulting pressure between successive layers of glass ribbon is greater than zero pounds per square inch (0 kg/square cm) and is less than or equal to 7 pounds per square inch (0.492 kg/square cm).

According to a twenty third aspect, there is provided the method according to any one of Aspects 15-22, wherein the winding is performed with a web tension of greater than zero pounds per linear inch (0 kg/cm) and of less than or equal to 0.25 pounds per linear inch (0.045 kg/cm) on the glass ribbon.

According to a twenty fourth aspect, there is provided the method according to any one of Aspects 15-23, wherein the winding is performed so that the glass ribbon is disposed in an inner-most layer and an outer-most layer, wherein a lateral offset between the inner-most layer and the outer-most layer is less than or equal to 1.6 mm, evening rolls having up to about 150 layers or more of glass ribbon 20, for example, more than 2 layers, more than 3 layers, more than 4 layers, more than 5 layers, more than 6 layers, more than 7 layers, more than 8 layers, more than 9 layers, more than 10 layers, more than 15 layers, more than 20 layers, more than 30 layers, more than 40 layers, more than 50 layers, more than 60 layers, more than 70 layers, more than 80 layers, more than 90 layers, more than 100 layers, more than 110 layers, more than 120 layers, more than 130 layers, more than 140 layers, from 1-150 layers, from 2-150 layers, from 3-150 layers, from 4-150 layers, from 5-150 layers, from 6-150 layers, from 7-150 layers, from 8-150 layers, from 9-150 layers, from 10-150 layers, from 15-150 layers, from 20-150 layers, from 30-150 layers, from 40-150 layers, from 50-150 layers, from 60-150 layers, from 70-150 layers, from 80-150 layers, from 90-150 layers, from 100-150 layers, from 110-150 layers, from 120-150 layers, from 130-150 layers, or from 140-150 layers.

According to a twenty fifth aspect, there is provided the method according to any one of Aspects 15-24, wherein the interlayer comprises a first portion and a second portion disposed at a distance from one another and having a width, wherein the width is centered within ±10% of the center of the glass ribbon,
   wherein the glass ribbon has an outboard end portion, and
      further wherein there is no interlayer disposed on the outboard end portion.

According to a twenty sixth aspect, there is provided the method according to any one of Aspects 15-24, wherein the interlayer has a first width, the glass ribbon has a second width and an outboard end portion,
   wherein the first width is less than the second width, and
      further wherein there is no interlayer disposed on the outboard end portion.

According to a twenty seventh aspect, there is provided the method according to any one of Aspects 15-26, wherein the glass ribbon comprises a bead on one of its edges.

According to a twenty eighth aspect, there is provided the method according to Aspect 27, wherein the interlayer has a thickness when compressed at a roll-winding pressure up to 70 kPa (10 psi), the bead has a thickness, and the interlayer thickness is greater than a difference between the bead thickness and the ribbon thickness.

According to a twenty ninth aspect, there is provided the method according to any one of Aspects 15-28, wherein the interlayer comprises polyethylene foam.

According to a thirtieth aspect, there is provided the method according to any one of Aspects 15-29, wherein the winding comprises winding the glass ribbon and interlayer around a core.

According to a thirty first aspect, there is provided a roll of material comprising: interleaving material wound together with glass ribbon, wherein a pressure between layers in the roll is ≤10 pounds per square inch (0.703 kg/square cm), and is greater than 0 pounds per square inch (0 kg/square cm).

According to a thirty second aspect, there is provided the roll of material of aspect 31, wherein the pressure between layers in the roll is ≤7 pounds per square inch (0.492 kg/square cm), and is greater than 0 pounds per square inch (0 kg/square cm).

According to a thirty third aspect, there is provided the roll of material of any one of aspect 31 or aspect 32, wherein the interleaving material is thickness compliant.

According to a thirty fourth aspect, there is provided the roll of material of aspect 33, wherein the interleaving material is polyethylene foam.

According to a thirty fifth aspect, there is provided the roll of material of any one of aspects 31-34, wherein the interlayer roll pressure is approximately constant throughout the roll.

According to a thirty sixth aspect, there is provided the roll of material of any one of aspects 31-35, wherein the glass ribbon has a thickness ≤0.3 mm.

BRIEF DESCRIPTION OF THE DRAWINGS

FIG. 5 is a schematic cross-section of a roll of glass ribbon and interlayer material, similar to that shown in FIG. 2, but according to another embodiment.

FIG. 6 is a schematic cross-section of a roll of glass ribbon and interlayer material, similar to that shown in FIG. 2, but according to another embodiment.

DETAILED DESCRIPTION

Figure 1:
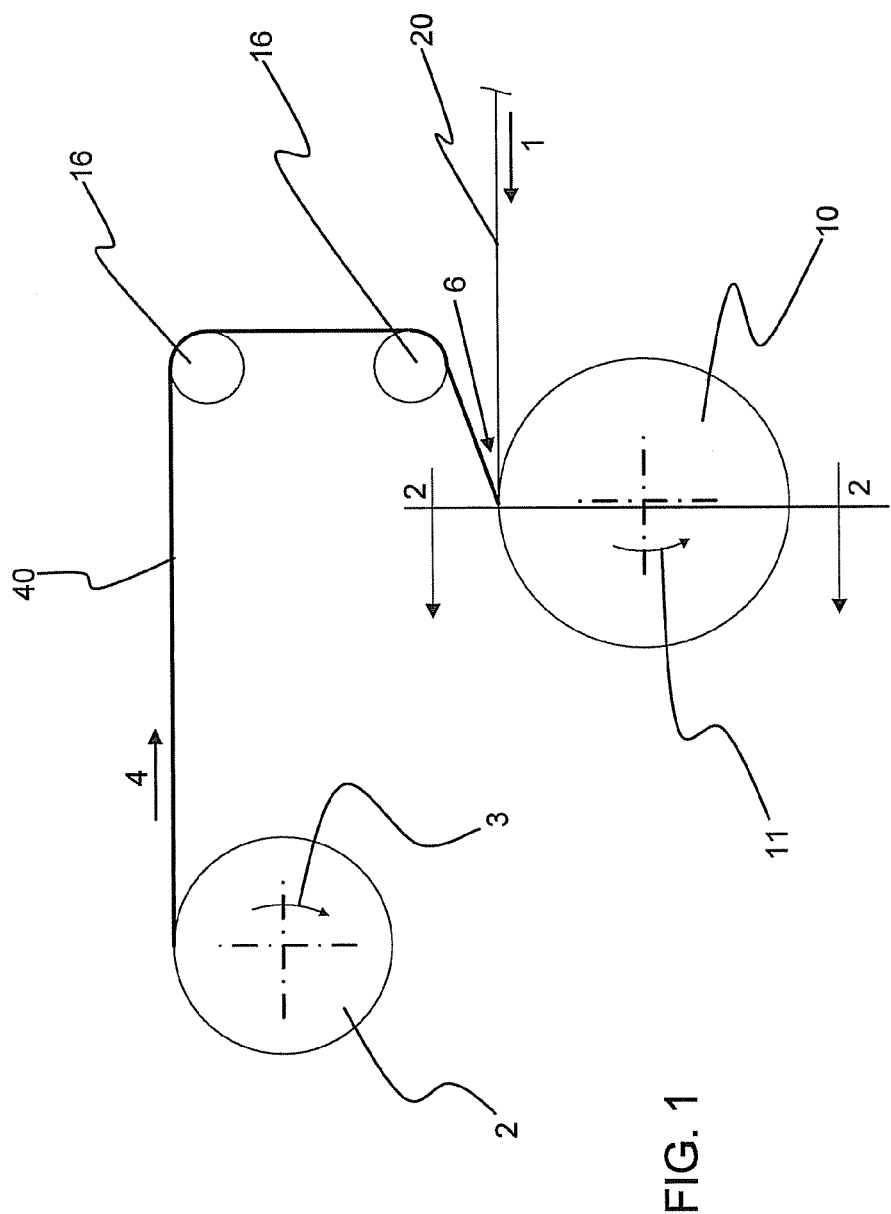
FIG. 1 is a schematic drawing of a roll winding process.

In the following detailed description, for purposes of explanation and not limitation, example embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

FIG. 1 is a schematic drawing of a process for rolling a glass ribbon 20. The glass ribbon 20 is—after being produced by any suitable method, for example, down-draw, fusion draw, up-draw, slot draw, or float—fed along direction 1 toward roll 10, which rotates in a direction 11. At the same time, an interlayer material 40 is unwound from roll 2 rotating in direction 3 and is fed along direction 4. The interlayer 40 is positioned relative to the roll 10 by guide rollers 16. According to one aspect, the interlayer 40 is wound around a core 12 (see FIG. 2) one or more times before glass ribbon 20 is fed into the nip 6 between successive layers of interlayer 40. According to another aspect, the glass ribbon 20 is wound around the core 12 and the interlayer 40 is then fed into a nip between successive layers of glass ribbon 20, although the former aspect is preferred. In either case, the glass ribbon 20 and interlayer 40 are wound together to form a roll 10 around core 12. The core 12 may remain in the roll 10 or be removed therefrom. When the core 12 is to remain in the roll 10, the inner-most layer (either interlayer material or glass ribbon) may be attached to the core 12. Keeping the core 12 in the roll 10, and attaching the interlayer material 40 to the core 12 assists in preventing the entire spooled glass/interlayer pack from side shifting during unwinding in subsequent processes steps.

Figure 2:
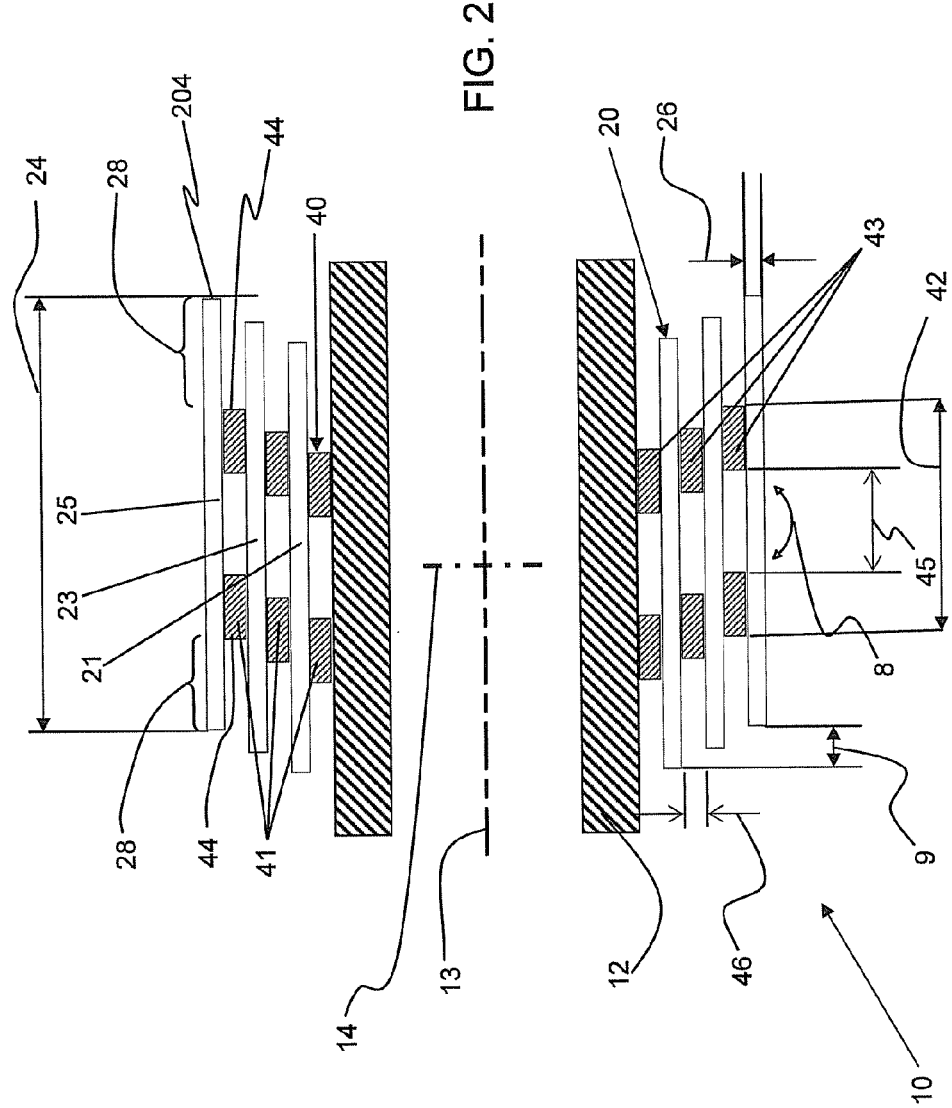
FIG. 2 is a schematic cross-section of a roll of glass ribbon and interlayer material as taken along line 2-2 in FIG. 1.

A cross section of the roll 10 is shown in FIG. 2, which is a view taken along line 2-2 in FIG. 1, but which omits the top interlayer so as to make illustration more clear. As seen in FIG. 2, the roll 10 includes glass ribbon 20, interlayer 40, and optionally a core 12 around which the glass ribbon 20 and interlayer 40 are wound. The core 12, when present, includes a central longitudinal axis 13, and a central axis 14 in the width-wise direction of the core 12.

Figure 3:
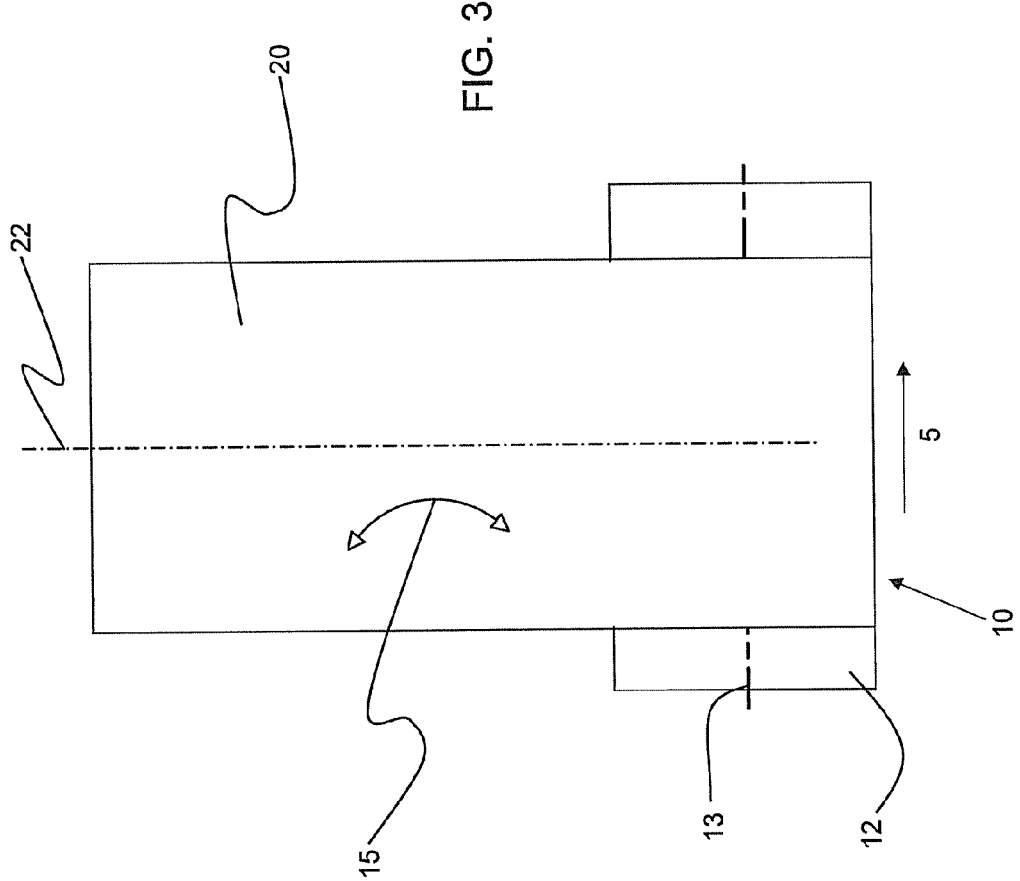
FIG. 3 is a schematic top view of the roll in FIG. 1.

The glass ribbon 20 is disposed in an inner-most layer 21, an intermediate layer 23, and an outermost layer 25. Although only three layers are shown, there may be any suitable number (including zero) of intermediate layers 23 between layers 21 and 25. The glass ribbon 20 has a thickness 26, which may be from about 50 microns to about 300 microns, and a width 24. The glass ribbon 20 also includes outboard end portions 28 in which there is the greatest likelihood of thickness variation due to the forming process. Further, the glass ribbon includes edges 204 which may be as-formed edges or cut edges. Still further, there is a lateral offset 9 between the inner-most layer 21 and the outer-most layer 25 of the glass ribbon. A lateral offset 9 may also exist between any two adjacent layers of the glass ribbon 20. Moreover, as shown in FIG. 3, the glass ribbon 20 includes a central longitudinal axis 22.

As shown in FIG. 2, according to one aspect, the interlayer material 40 is formed as a first strip 41 and a second strip 43 separated by a distance 45. The interlayer 40 includes an overall width 42 between outside edges 44 on the strips 41, 43 in one layer. Also, the interlayer 40 includes a thickness 46.

The effects of camber (continuous curvature in one direction caused by differential cooling between the two edge beads during the forming process, for example) will be explained with reference to FIG. 3, which is a top view of the roll 10 (without interlayer 40 for purposes of facilitating explanation). For simplicity in this discussion, it is assumed that camber is the only factor affecting the lateral offset of the roll 10. As core 12 is rotated about central longitudinal axis 13, glass ribbon 20 is wound into roll 10. If there were no camber in the glass ribbon 20, the central longitudinal axis 22 of the glass ribbon 20 would remain substantially perpendicular to the central longitudinal axis 13, whereby the glass ribbon 20 would be wound into roll 10 having straight side walls, i.e., there would be little if any lateral offset. However, in the presence of camber, the glass ribbon 20 is continuously curved so that the longitudinal axis 22 is bent in the direction shown in an exaggerated manner by double headed arrow 15, thereby producing forces on the glass ribbon 20 making it tend to shift in the direction of arrow 5, whereby the sides of roll 10 become angled, and the lateral offset may increase.

In order to form a roll 10 of wound glass ribbon having straight side walls, i.e., one with a small lateral offset 9 (from layer to adjacent layer of the glass ribbon, as well as overall from inner-most layer 21 to outer-most layer 25 of glass ribbon), the inventors have found that the effects of camber, among other things, can be counteracted by appropriately choosing an interleaf material and rolling conditions.

Some pertinent characteristics of the interleaf material are its coefficient of friction with the glass ribbon being wound, the width of the interlayer with respect to that of the glass ribbon, compliance, and thickness.

The inventors have found that choosing an interlayer with a static coefficient of friction of greater than or equal to about 3.0 (as measured with a vertical force of 0.5N), or from about 3.0 to about 4.6 (as measured with a vertical force of 0.5 N), or from about 3.4 to about 4.2 (as measured with a vertical force of 0.5N) with the glass ribbon assists in maintaining a roll with straight side walls. A static coefficient of friction in this range assists in producing forces that resist the effects of camber as described above in connection with FIG. 2, and that assist in holding the layers of the roll in place during handling. The higher the static coefficient of friction, the more resistant to the effects of camber the roll will be, and the more stable during handling the roll will be. If the static coefficient of friction becomes too small, then there are not produced sufficient forces to resist the effects of camber in the glass ribbon as it is wound and the walls of the roll become angled, stepped, or otherwise no longer straight. Further, if the static coefficient of friction is too low, there are not sufficient forces to hold the layers of the roll in place during handling of the roll.

By choosing an interlayer material 40 having a static coefficient of friction within the above-noted ranges, there can be produced a roll having a lateral offset 9 (see FIG. 2) between an inner-most layer 21 of the glass ribbon 20 and an outer-most layer 25 of the glass ribbon of less than or equal to 1.6 mm. A lateral offset 9 of less than or equal to 1.6 mm can be obtained even in rolls 10 having up to about 150 layers or more of glass ribbon 20, for example, more than 2 layers, more than 3 layers, more than 4 layers, more than 5 layers, more than 6 layers, more than 7 layers, more than 8 layers, more than 9 layers, more than 10 layers, more than 15 layers, more than 20 layers, more than 30 layers, more than 40 layers, more than 50 layers, more than 60 layers, more than 70 layers, more than 80 layers, more than 90 layers, more than 100 layers, more than 110 layers, more than 120 layers, more than 130 layers, more than 140 layers, from 1-150 layers, from 2-150 layers, from 3-150 layers, from 4-150 layers, from 5-150 layers, from 6-150 layers, from 7-150 layers, from 8-150 layers, from 9-150 layers, from 10-150 layers, from 15-150 layers, from 20-150 layers, from 30-150 layers, from 40-150 layers, from 50-150 layers, from 60-150 layers, from 70-150 layers, from 80-150 layers, from 90-150 layers, from 100-150 layers, from 110-150 layers, from 120-150 layers, from 130-150 layers, or from 140-150 layers. This small amount of lateral offset 9 makes the roll easy to unwind into a manufacturing process.

Figure 4:
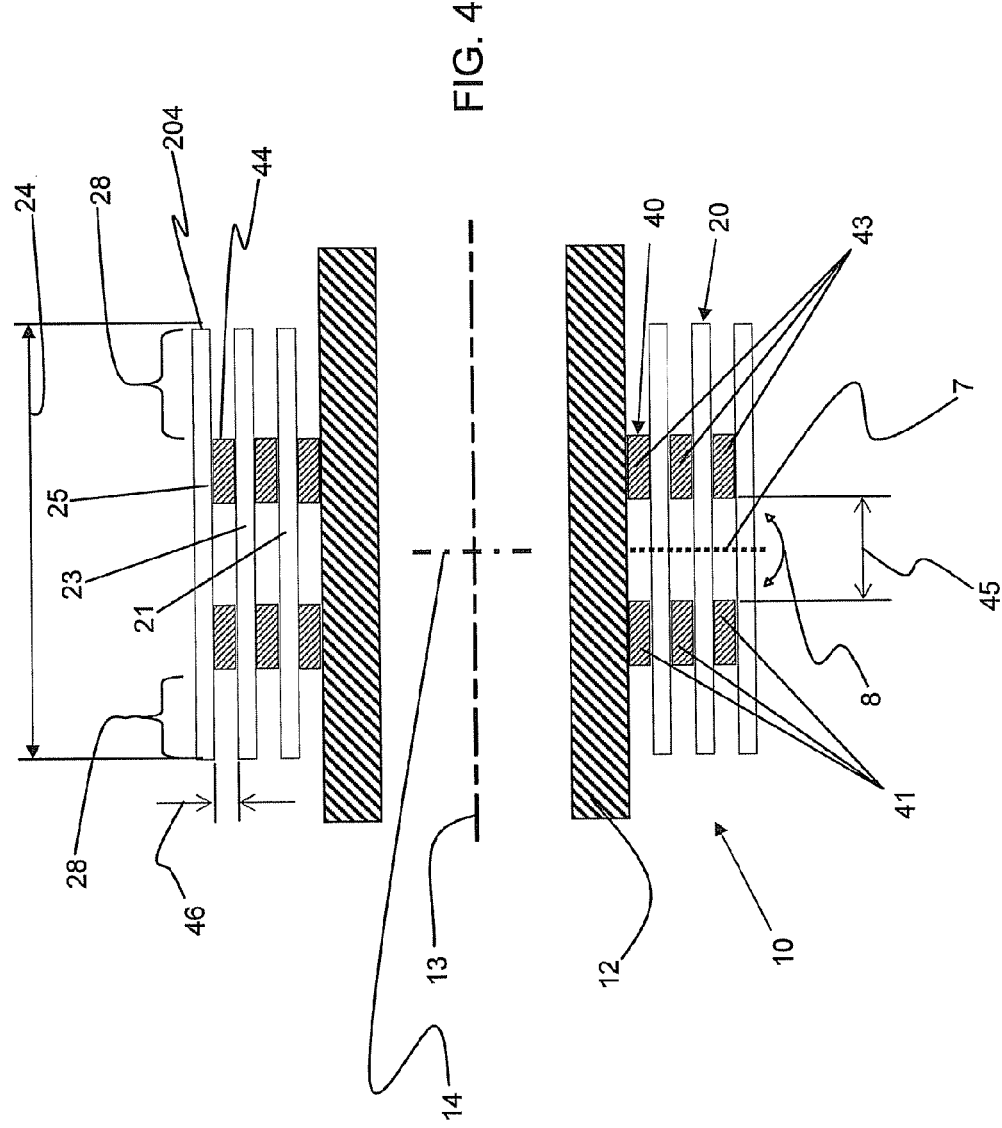
FIG. 4 is schematic cross-section of a roll of glass ribbon and interlayer similar to that shown in FIG. 2.

Width and thickness of the interlayer material 40 also assist in producing a roll 10 with straight side walls. For example, with reference to FIG. 2, the width 42 of the interlayer 40 may be chosen to as to be less than the width 24 of the glass ribbon. By choosing the width 42 to be less than the width 24, the glass ribbon 20 has more freedom to pivot in the direction of double-headed arrow 8 due to the effects of differential cross web thickness and/or camber thereby reducing the amount of compression required to compensate for these effects. Additionally, the interlayer 40 is placed away from the outboard portions 28 of the glass ribbon 20. Accordingly, by placing the interlayer material 41, 43 on the central portion of the glass ribbon 20 in which there is less likelihood of thickness variation, the roll 10 becomes more stable and more likely to have straight side walls. Further, the strips 41, 43 may be placed so that the distance 45 is centered within ±10% from the center 7 (in the width-wise direction) of the glass ribbon 20. See FIG. 4. Alternatively, or in addition thereto, the strips may be placed so that the overall width 42 is centered within ±10% from the center 7 of the glass ribbon 20. See FIG. 2. In this latter case, again the strips are placed away from the outboard portions 28. The latter case may be used with either two strips 41, 43, or when more or less than two strips are present.

FIG. 5 shows alternative embodiments of each the glass ribbon 20 and the interlayer 40. It is to be understood that the glass ribbon 20 shown in this figure may be used with the interlayer material of the other figures, and the interlayer 40 in this figure may be used with the glass ribbon 20 of the other figures. The main differences from the other figures lie in the physical configuration of the glass ribbon 20 and interlayer material 40. Accordingly, for ease in description mainly the differences will be described with the understanding that the remaining properties, and like characteristics as denoted by like reference numerals, may remain the same. In this figure the glass ribbon 20 is shown as including beads 30 having a thickness 32. Further, the interlayer material 40 is formed as one continuous piece having a width 42, outside edges 44, and a thickness 46. The thickness 46 is chosen so that when the interlayer 40 is subject to a pressure between the layers in the roll, as described below, the interlayer 40 maintains a gap 34 between adjacent beads 30, thereby allowing the glass ribbon 20 to be wound into roll 10 without damage from the beads 30 contacting one another. Again, as noted above, the width 42 is less than the width 24, and the interlayer material 40 is not disposed on the outboard end portions 28 wherein the thickness variation in the glass ribbon is exaggerated due to the presence of the beads 30. Again, the width 42 may be centered, within ±10% of the center 7 of the glass ribbon 20.

Lastly, as far as the characteristics of the interlayer, the compliance of the interlayer material 40 plays a role in forming a roll 10 with straight side walls by compensating for thickness variation in the glass ribbon 20. The effects of thickness variation will be described with reference to FIG. 6. In this figure, ignoring beads 30 for the moment, the glass ribbon is shown with a thickness 27 on a left-hand edge and a second, greater, thickness 29 on the right-hand edge. If the interlayer 40 were not compliant, but rigid, the greater thickness 29 would cause the glass ribbon 20 to tilt upwards from left to right (as when viewing the top portion of the roll 10 as shown in FIG. 6). In so tilting, layer 23 would then tend to push the next layer 23 in the direction of arrow 5 causing the side wall of the roll 10 to shift rightward. The effects of the thickness difference would build on one another as it is likely that the same differences in thickness 27, 29 would be repeated as the ribbon 20 is formed. However, by choosing a compliant interlayer material 40, the interlayer 40 compensates for the difference in thicknesses 27, 29. More specifically, the interlayer 40 would compress more when adjacent to the portion of the glass ribbon 20 having a greater thickness 29, and compress less when adjacent to the portion of the glass ribbon 20 having the smaller thickness 27. That is, as shown in FIG. 6, under roll compression, the interlayer 40 would assume a smaller thickness 49 the right-hand side, and a greater thickness 47 on the left-hand side, thereby allowing the layer 23 to assume an approximately horizontal orientation despite its difference in thicknesses 27, 29. In this case, thickness 49 is still sufficient to maintain a suitable gap 34 between the beads 30. A suitable stiffness for the interlayer material 40 was found to be less than or equal to about 28.14 N/mm, or less than or equal to about 27.12 N/mm, or less than or equal to about 26.1 N/mm, wherein the lower bound for all ranges was greater than zero. In order to achieve the above-noted stiffness, the interlayer 40 may be formed from, for example, a polyethylene foam (either open or closed cell), a corrugated paper material, or a sheet of soft polyvinyl material having an embossed or textured surface.

The rolling conditions also play a part in forming a roll with straight side walls. Some pertinent rolling conditions are web tension and pressure between the layers in the roll. Surprisingly, the inventors found that using a low web tension and a low pressure between the layers produced straighter side walls in the roll—i.e., where "low" was lower than typically expected. More particularly, a web tension of greater than 0 pounds per linear inch (0 kg/cm), but 0.25 pounds per linear inch (0.45 kg/cm) or less, produced straight side walls on the roll. Additionally, a pressure between the layers in the roll of 10 pounds per square inch (0.703 kg/square cm) or less, but greater than 0 pounds per square inch (0 kg/square cm), produced straight side walls on the roll. Another pressure between the layers in the roll of 7 pounds per square inch (0.492 kg/square cm) or less, but greater than 0 pounds per square inch (0 kg/square cm), also produced straight side walls on the roll. Further, the above-noted coefficients of friction between the interlayer and glass ribbon facilitated using the above-noted unusually low web tension and pressure between the layers in the roll. The web tension and pressure ranges may be used with any of the configurations of glass ribbon 20 and interlayer material 40 described herein to produce the above-noted minimal lateral offsets 9, even when the roll includes up to about 150 layers or more of glass ribbon 20.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the present invention and protected by the following claims.

For example, although the core is shown without flanges on its ends, flanges could be present. Further, the flanges could be permanently attached to the core, or could be removable.

Additionally, although three layers of interlayer and three layers of glass ribbon are shown as being wound on a roll, any suitable number of layers of either may be present.

Further, although a layer of glass ribbon is shown as being the outermost layer of the roll, it need not be. That is, the interlayer may be wound one or more times around the outermost layer of glass ribbon in order to protect that layer. Similarly, although an interlayer is shown as being the innermost layer of the roll, it need not be; the inner-most layer of glass ribbon could be the inner-most layer of the roll. Nonetheless, it is preferable to have an interlayer as the inner-most layer of the roll in order to protect the inner-most layer of glass ribbon.

Still further, although the center 7 of the glass ribbon 20 is shown as being aligned with the center 14 of the core 12, such need not be the case.

What is claimed is:

1. A roll of glass ribbon, comprising:
    a glass ribbon;
    an interlayer wound together with the glass ribbon, wherein the glass ribbon has a thickness of 0.3 mm or less,
    wherein the static coefficient of friction between the interlayer and the glass ribbon is greater than or equal to 3.0 (as measured with a vertical force of 0.5 N).

2. The roll according to claim 1, wherein the stiffness of the interlayer is less than or equal to 28.14 N/mm.

3. The roll according to claim 1, wherein the pressure between successive layers of glass ribbon is less than or equal to 10 pounds per square inch (0.703 kg/square cm).

4. The roll according to claim 1, wherein the interlayer and glass ribbon are wound so that a lateral offset between an inner-most layer of the glass ribbon and an outer-most layer of glass ribbon is less than or equal to 1.6 mm.

5. The roll according to claim 1, wherein the interlayer comprises a first portion and a second portion disposed at a distance from one another and having a width, wherein the width is centered within ±10% of the center of the glass ribbon,
    wherein the glass ribbon has an outboard end portion, and
    further wherein there is no interlayer disposed on the outboard end portion.

6. The roll according to claim 1, wherein the interlayer has a first width, the glass ribbon has a second width and an outboard end portion, wherein the first width is less than the second width, and
    further wherein there is no interlayer disposed on the outboard end portion.

7. The roll according to claim 1, wherein the glass ribbon comprises a bead on one of its edges and wherein the interlayer has a thickness when compressed at a roll-winding pressure up to 70 kPa (10 psi), the bead has a thickness, and the interlayer thickness is greater than a difference between the bead thickness and the ribbon thickness.

8. A method of winding a glass ribbon, comprising:
    winding an interlayer together with a glass ribbon, wherein the glass ribbon has a thickness of 0.3 mm or less,
    wherein the static coefficient of friction between the interlayer and the glass ribbon is greater than or equal to 3.0 (as measured with a vertical force of 0.5 N).

9. The method according to claim 8, wherein the stiffness of the interlayer is less than or equal to 28.14 N/mm.

10. The method according to claim 8, wherein the winding is performed so that a resulting pressure between successive layers of glass ribbon is greater than zero pounds per square inch (0 kg/square cm) and is less than or equal to 10 pounds per square inch (0.703 kg/square cm).

11. The method according to claim 8, wherein the winding is performed with a web tension of greater than zero pounds per linear inch (0 kg/cm) and of less than or equal to 0.25 pounds per linear inch (0.45 kg/cm) on the glass ribbon.

12. The method according to claim 8, wherein the winding is performed so that the glass ribbon is disposed in an innermost layer and an outer-most layer, wherein a lateral offset between the inner-most layer and the outer-most layer is less than or equal to 1.6 mm.

13. The method according to claim 8, wherein the interlayer comprises a first portion and a second portion disposed at a distance from one another and having a width, wherein the width is centered within ±10% of the center of the glass ribbon,
    wherein the glass ribbon has an outboard end portion, and
    further wherein there is no interlayer disposed on the outboard end portion.

14. The method according to claim 8, wherein the interlayer has a first width, the glass ribbon has a second width and an outboard end portion,
    wherein the first width is less than the second width, and
    further wherein there is no interlayer disposed on the outboard end portion.

15. The method according to claim 8, wherein the glass ribbon comprises a bead on one of its edges and wherein the interlayer has a thickness when compressed at a roll-winding pressure up to 70 kPa (10 psi), the bead has a thickness, and the interlayer thickness is greater than a difference between the bead thickness and the ribbon thickness.

16. A roll of material comprising:
    interleaving material wound together with glass ribbon, wherein a pressure between layers in the roll is ≤10 pounds per square inch (0.703 kg/square cm), and is greater than 0 pounds per square inch (0 kg/square cm).

17. The roll of material of claim 16, wherein the interleaving material is thickness compliant.

18. The roll of material of claim 17, wherein the interleaving material is polyethylene foam.

19. The roll of material of claim 16, wherein the inter-layer roll pressure is approximately constant throughout the roll.

20. The roll of material of claim 16, wherein the glass ribbon has a thickness ≤0.3 mm.

* * * * *